United States Patent [19]

Schaffer

[11] Patent Number: 5,152,598
[45] Date of Patent: Oct. 6, 1992

[54] HOLE LOCATOR DEVICE

[76] Inventor: Garry D. Schaffer, 1739 Mariposa Dr., Dallas, Tex. 75228

[21] Appl. No.: 602,625

[22] Filed: Oct. 24, 1990

[51] Int. Cl.$^5$ .............................................. F21V 7/04
[52] U.S. Cl. ..................................... 362/32; 362/109; 362/120; 362/186; 7/170; 81/488
[58] Field of Search ................ 294/66.2; 362/32, 186, 362/109, 119, 120; 29/241; 7/106, 170; 81/488

[56] References Cited

U.S. PATENT DOCUMENTS

| | | | |
|---|---|---|---|
| 2,344,370 | 3/1944 | Shapiro | 362/32 |
| 3,582,638 | 6/1971 | Peters | 362/32 |
| 3,645,227 | 2/1972 | Lahmer | 362/31 |
| 4,231,077 | 10/1980 | Joyce et al. | 362/32 |
| 4,302,797 | 11/1981 | Cooper | 362/32 |
| 4,775,920 | 10/1988 | Seibert et al. | 362/32 |

Primary Examiner—Ira S. Lazarus
Assistant Examiner—Sue Hagarman
Attorney, Agent, or Firm—Morgan L. Crow

[57] ABSTRACT

A hole locator for use by installers of electrical fixtures is disclosed. The locator comprises a tapered shank of light conducting material having means at a first end to pierce a hole in a panel such as a ceiling. The tapered shank wedges in the pierced hole to hold the locator in place. A light source in the second end provides light through the length of the hole locator so the installer can easily find the locator from the opposite side of the panel. An eye or a hook in the first end provides means for pulling a wire or a pull string through the hole when the locator is withdrawn from the pierced hole.

8 Claims, 1 Drawing Sheet

HOLE LOCATOR DEVICE

FIELD OF THE INVENTION

This invention relates to the service industry involved in the installation of electrically wired devices such as light fixtures and ceiling fans.

DESCRIPTION OF RELATED ART

Electricians and others who install electrically wired devices such as light fixtures and ceiling fans in new construction as well as remodelling work have had difficulty in locating a position to hang a fixture, for example in the center of a ceiling. The practice is to locate the point where a fixture is to be located and cutting a hole in the ceiling. Then a small wood stick or wire is pushed through the hole, and the installer climbs into the attic. Then, using a flashlight, attempts to locate the stick or wire inserted into the hole. If there is insulation on the ceiling, and the attic is not well lighted, excessive time may be required to locate the stick or wire marking the location of the hole. Excessive time spent locating the hole can be costly in terms of the money cost of labor time wasted in searching for the hole. Excessive search time can also be frustrating to the installer. The installer can also experience discomfort if the attic or other search area is excessively hot or cold.

U.S. Pat. No. 3,582,638 issued to M. E. Peters teaches the use of a flashlight attached to a flexible light guide to directing emitted light to a remote, difficult to illuminate spot. This teaching does not solve the problem of locating a hole in a ceiling for someone installing a fixture in a ceiling.

U.S. Pat. No. 4,339,200 issued to W. S. Corbin teaches the use of a flashlight attached to one end of a bent transparent Plexiglass rod and a lens and mirror on the opposite end of the Plexiglass rod for insertion in a gun bore provide illumination and a view of a gun bore.

U.S. Pat. No. 4,544,990 issued to A. Wieselman teaches the use of a telescopic signalling device utilizing light transmissive telescopic elements in combination with a flashlight.

None of the above mentioned patents teaches the design of a device which can be used to pierce a hole in wallboard. None of the above mentioned devices teaches the design of a device which will hold itself in position in a hole to indicate the location of the hole in a ceiling or wall board.

SUMMARY OF THE INVENTION

A hole locator is disclosed for use of installers and the like for piercing a hole in a ceiling, wall, or other panel by inserting an elongate instrument through the hole, illuminating the elongate instrument to facilitate locating the hole from the other side, and providing means to pull wires or a pule string; then wires through the hole to connect an electrically powered device.

DESCRIPTION OF THE PREFERRED EMBODIMENT

Figure 1:
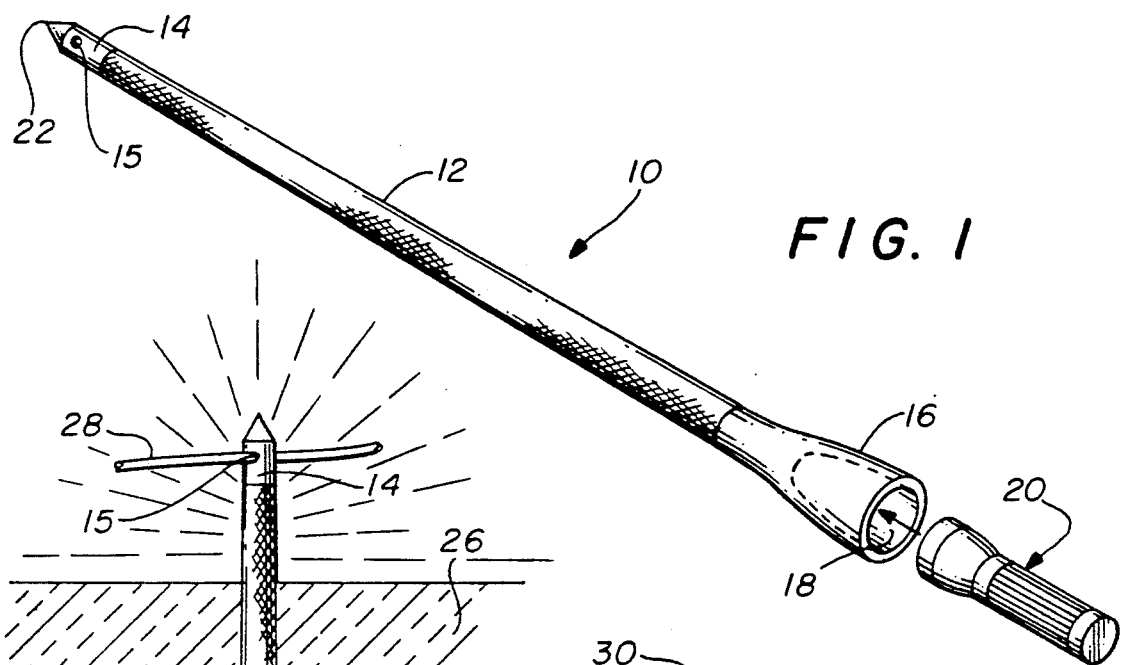
FIG. 1 is an exploded perspective view of the preferred embodiment.

In FIG. 1, the preferred embodiment is shown generally at 10, comprising a translucent or transparent tapered plastic shank 12, a tip means 14, a base 16, and a socket 18. The tip 14 is about ¼ inch in diameter, and may be configured with an integral sharp point 22 which may be used to pierce a hole in a plasterboard ceiling. Means to provide light is a standard commercial flashlight 20 of the size using 2 of the standard "AA" batteries. Preferably, the locator 10 is a one piece plastic part, except for the light source 20. Discontinuities in the shape of the tip end 14 will reflect the light transmitted from the light means 20 so the locator can be seen in a dark attic as well as a reasonably well lit area.

Figure 2:
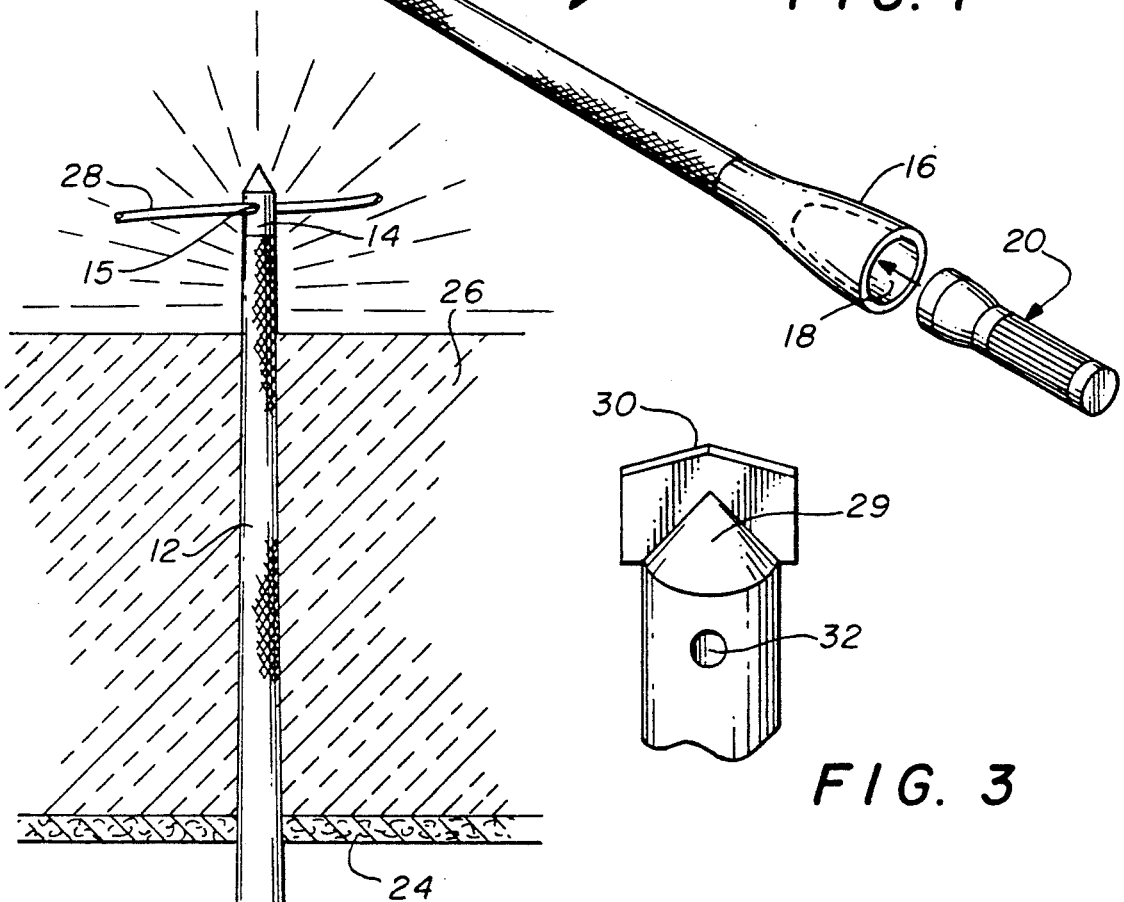
FIG. 2 is an elevation view of the preferred embodiment in use.

Referring now to FIG. 2, the hole locator is inserted through a ceiling 24 at a location where is desired to install an electrically powered apparatus such as a light fixture or a ceiling fan. The location is usually best determined from inside the room. The location is determined, and the hole locator is inserted through the ceiling 24, using the point 22 to pierce the hole, or in case of a ceiling of such strength or thickness as to render the making of such a hole impractical, the hole may be predrilled to a common size such as ½ inch with a drill and bit as an installer would ordinarily have to install such apparatus.

The shank 12 of the hole locator has a slight taper so that it will wedge in the hole in the ceiling 24 at any position after being pushed into a hole pierced by the hole locator, or after the locator is pushed in far enough so that the shank 12 exceeds the size of the predrilled hole.

Once the hole locator is inserted through the ceiling 24, it is pushed far enough through for the tip 14 to pierce and pass through a layer of insulation 26 which may be present. Such insulation is commonly installed above ceilings. The locator 10 desirably is long enough to pierce the ceiling panel and any insulation which may be present on top of the ceiling. The flashlight 20 is turned on and the installer goes into the area above the ceiling where the lighted tip 14 is readily visible, even in a dark attic. Once the hole locator is found, the wire or pull string 28 may be inserted into the eye 15 in the tip 14. The installer may then return to the room where the fixture is to be installed, and withdraw the locator to pull the wire or pull string through the ceiling 24 into the room. If a pull string was attached to the hole locator, it can then be used to pull the wire through to make the necessary connections.

DESCRIPTION OF ALTERNATIVE EMBODIMENTS

The preferred embodiment is made of a clear plastic molding, although it could be molded from clear plastic, or machined from a clear plastic rod. As an alternate, the locator could be made of a translucent plastic rather a transparent plastic. The transparent plastic is preferred because of better light transmission through the length of the hole locator.

Figure 3:
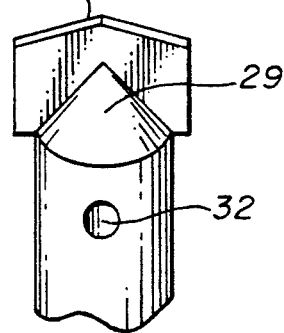
FIG. 3 is a partial perspective view of an alternate embodiment.

Referring now to FIG. 3, a metal tip 30 is illustrated which may be fitted to the tip 29 of hole locator to provide at least one sharp hard cutting edge which may be used to form a hole in harder, thicker ceiling materials than the plastic hole locator 10. An eye 32 is provided for threading wire or a pull string as described above.

Figure 4:
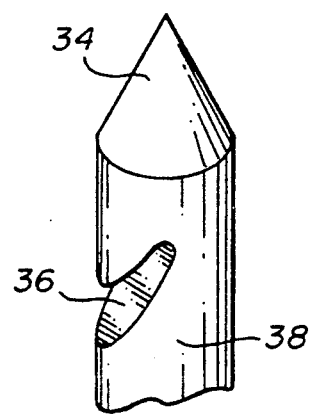
FIG. 4 is a partial perspective view of an alternate embodiment.

Referring now to FIG. 4, the tip 34 may have a side hook opening 36 rather than the eye 15 as illustrated in FIG. 1. The pull string or wire would be easier to engage to the hook rather than to insert the pull string or wire through an eye. Once the hole locator is inserted and pushed through the hole into position, a loop of the pull string or wire could be positioned around the hole locator shank 38. Then, by pulling the pull string or wire taut and sliding the pull string or wire toward the tip, the engagement can be accomplished. Then the installer can pull the wire through the hole by withdrawing the locator from the panel side from which the locator was inserted.

For purposes of this specification, panel is defined as a ceiling, wall or other panel where it is desired to use an embodiment of this invention. For purposes of this specification, an eye is defined as a transverse hole in the hole locator analogous to and similar to an eye in a needle.

Although embodiments of this invention have been illustrated in the accompanying drawings, and described in the foregoing Detailed Descriptions, it will be understood that the invention is not limited to the embodiments disclosed, but is capable of numerous rearrangements, modifications, substitutions and reversal of parts without departing from the spirit and scope of the invention.

I claim:

1. Apparatus for locating a hole in a panel and pulling a wire therethrough comprising:
    means for receiving light means in a first end,
    tip means in a second end smaller than the first end, and
    translucent shank means connecting the first end and second end, the shank having a taper between the first end and second end, tapered smaller toward the second end, the shank means adapted for frictional engagement in the hole and for transmitting light from the light receiving means to the tip means and an eye in the second end to engage the wire to be pulled through the hole.

2. Apparatus according to claim 1 further including light means in the first end.

3. Apparatus according to claim 1 wherein the tip means includes an integral sharp point for forming a hole in a panel.

4. Apparatus according to claim 1 further including a metal cutting edge in the tip means for forming a hole in a panel.

5. Apparatus for locating a hole in a panel and pulling a wire therethrough comprising:
    a translucent rod having a first end and a second end smaller than the first end,
    means for receiving a light source at the first end, and
    said rod having a taper between the first end and the second end, the rod adapted for frictional engagement in the hole and a hook in the second end to engage the wire to be pulled through the hole.

6. Apparatus according to claim 5 wherein the translucent rod is plastic.

7. Apparatus according to claim 5 wherein the second end is formed with an integral sharp point.

8. Apparatus according to claim 5 further including a metal cutting edge in the tip means for forming a hole in a panel.

* * * * *